United States Patent [19]

Koshizawa

[11] Patent Number: 5,661,472
[45] Date of Patent: Aug. 26, 1997

[54] OFF-LANE ALARM APPARATUS

[75] Inventor: Toshifumi Koshizawa, Fujisawa, Japan

[73] Assignee: Isuzu Motors Limited, Tokyo, Japan

[21] Appl. No.: 592,519

[22] Filed: Jan. 26, 1996

[30] Foreign Application Priority Data

Jan. 31, 1993 [JP] Japan .................... 7-013696

[51] Int. Cl.$^6$ ....................... G08G 1/00
[52] U.S. Cl. .............. 340/901; 340/903; 340/904; 340/937; 364/461; 348/118
[58] Field of Search ................ 340/901, 903, 340/904, 905, 435, 937; 348/113, 118, 148, 149, 169; 364/424.01, 424.02, 436, 460, 461

[56] References Cited

U.S. PATENT DOCUMENTS

| | | |
|---|---|---|
| 4,970,653 | 11/1990 | Kenue ..................... 364/461 |
| 5,341,437 | 8/1994 | Nakayama ................ 348/118 |
| 5,351,044 | 9/1994 | Mathur et al. ............ 340/901 |
| 5,414,625 | 5/1995 | Hattori .................... 364/424.02 |
| 5,517,412 | 5/1996 | Unoura .................... 364/424.02 |

FOREIGN PATENT DOCUMENTS 0 586 857 A1  3/1994  European Pat. Off. ........ 340/901

*Primary Examiner*—Brent A. Swarthout
*Assistant Examiner*—Van T. Trieu

[57] ABSTRACT

An off-lane alarm apparatus quantizes an image signal provided from a line camera mounted on a car roof is into a corresponding binary image by an image processing device to detect a lane on a road surface, so that an alarm is generated when an off-lane state of the car from the lane is detected. After mounting a line camera on a car, markers preset at predetermined positions outside of the car are shot and preliminarily stored as binary image signals and the positional information is used as car side positional information for alarm determinations.

10 Claims, 10 Drawing Sheets

F I G. 4
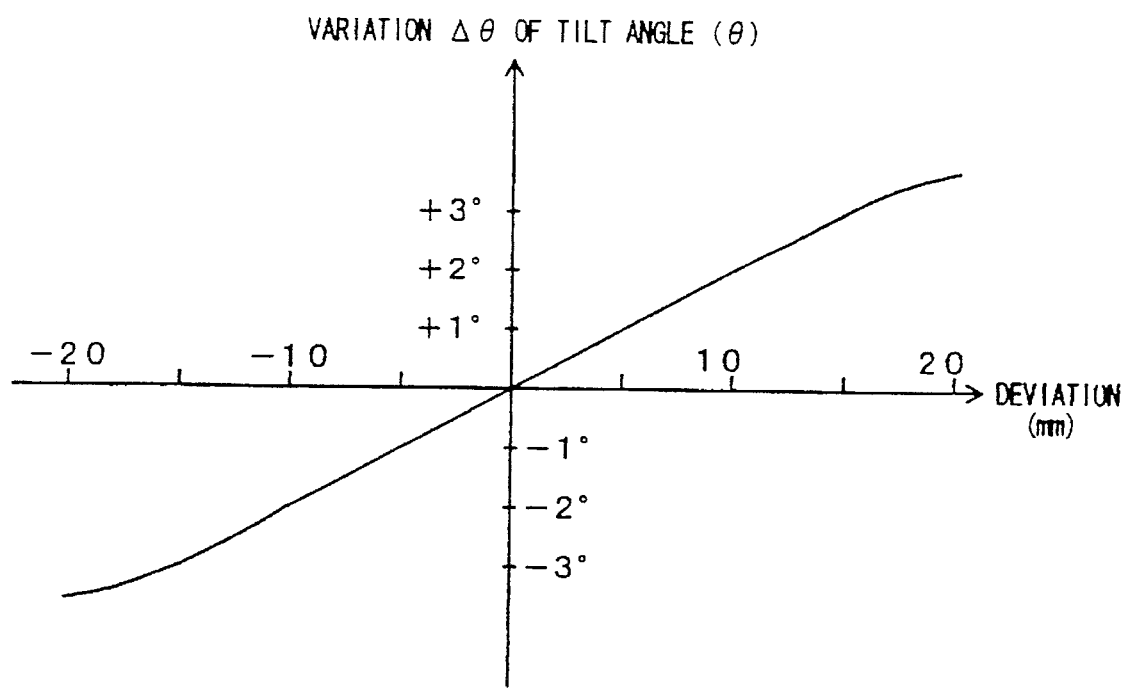

F I G. 8
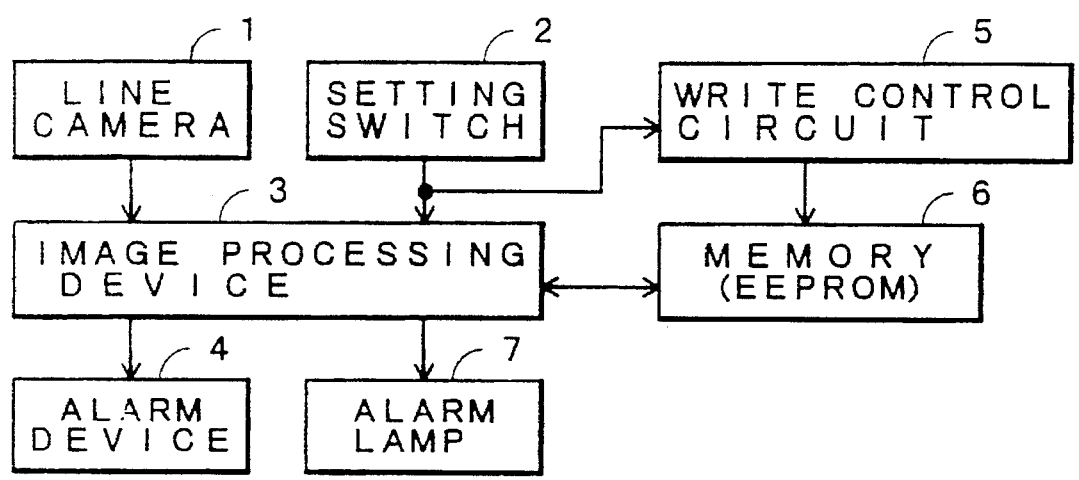

OFF-LANE ALARM APPARATUS

BACKGROUND OF THE INVENTION

1. Field of the Invention

This invention relates to an off-lane alarm apparatus, and in particular to an off-lane alarm apparatus wherein by monitoring a road surface in front of or behind a car by means of a line camera which is also called an image sensor, an off-lane i.e. deviated state of the car from its traffic lane (white or yellow lane) is sensed, and an alarm is generated.

2. The Prior Art

In the prior art off-lane alarm apparatus known from the past for example, the Japanese Patent Application No. 4-170593, as shown in FIGS. 10A and 10B, a line camera 1 is mounted at a predetermined front center of a car 20 to shoot a lane WL as an image on a road surface 30. The image is quantized into a corresponding binary image indicating position data of the lane WL. From the position data of the car 20 and the lane WL, i.e. a distance therebetween, it is determined (judged or decided) that whether or not the car 20 lies in an off-lane state from the lane WL. When the determination indicates an off-lane state, an alarm is given to a driver.

For such an alarm determination or judgement, this off-lane alarm apparatus geometrically presets a positional relationship between the line camera, the car, and the road surface to settle a positional relationship between the car and the lane, at the stage of design.

Therefore, if the mounted position of the line camera misses the geometric relationship preset by the design, the geometric positional relationship between the line camera, the car, and the road surface will be broken, leading to an erroneous off-lane alarm determination.

Namely, if it is supposed that for the geometric positional relationship the optical axis of the line camera of the off-lane alarm apparatus coincides with the center line of the car, when the mounted position of the line camera is out of place an area on the road surface detected by the line camera becomes asymmetric. Therefore, the detection of such an off-lane state on the left and the right car sides as a distance between the lane and the side end of the car becomes zero.

This provides an earlier or delayed detection. In other words, although being not symmetric, the positions of the both side ends of the car are erroneously assumed in relation to the center of the car.

Therefore, it is necessary to carefully conduct a mounting work for the line camera. In the prior art, whether or not the mounted state of the line camera is out of place after mounting was checked by reproducing the off-lane state in actual running or by connecting a particular monitoring device to the line camera.

However, such a checking or pre-adjusting method has a large disadvantage in that pre-adjusting the line camera requires a considerable time and special preparation in the mounting process.

Accordingly, the inventor of the present invention has proposed, in Japanese Patent Application No. 5-35363, a method for adjusting a mounting angle of a line camera. The line camera is positioned at a predetermined front center of a car, and horizontal position data of a binary image of a marker are initially set as reference data when the marker is placed at a predetermined front point on the center line of the car. At the time of adjustments, the horizontal position data of the binary image of the marker as shot and the reference data are compared. According to the difference as a result of the comparison, an output condition of an adjusting mode lamp is changed so that the binary image and the reference data at the time of adjustment may coincide with each other. In this case, the detected area of the line camera is made symmetric.

However, in the Japanese Patent Application No. 5-35363, a method for adjusting a mounting angle of the line camera has been proposed so that a geometric relation prescribed at the stage of design may be satisfied. It has a large disadvantage due to process time restriction in view of a car mounting the off-lane alarm apparatus being inspected and adjusted on the manufacturing lines.

SUMMARY OF THE INVENTION

It is accordingly an object of the present invention to provide an off-lane alarm apparatus wherein an image signal provided from a line camera mounted on a car roof is quantized into a corresponding binary image by an image processing device to detect a lane on a road surface, whereby an alarm is generated when an off-lane state of the car from the lane is detected and wherein a simple adjustment can be realized in a short time without using a special device even under such a circumstance as on car manufacturing lines.

For the achievement of the above noted object, in the present invention, a line camera is mounted at a front end portion of a car without particular adjustments; no adjustments for the mounting angle of the line camera are required.

While the line camera has a certain angular error with respect to the mounting angle as supposed at the stage of design, this angular error is not adjusted by the line camera as in the prior art but is automatically corrected in an off-lane alarm apparatus according to the present invention for an optimum alarm operation.

Namely, the line camera is positioned at a predetermined front center of the car to shoot markers. The markers are positioned at a predetermined outside point corresponding to a permissible error in the pan direction of the line camera on both side ends of the car. An image processing device has a memory. This memory has been preliminarily stored with horizontal position data of binary images of the markers as car side position data. The image processing device then generates an alarm on the basis of a positional relationship between the horizontal position data of the detected car and the positional data of both side ends of the car, thereby correcting and absorbing the mounting error of the line camera.

Investigations of a Mounting Angular Error of the Line Camera

FIG. 1 shows a state where a line camera is mounted at a front portion of a car. The line camera 1 is mounted downwardly at a front upper end portion of a cab of the car 20, and the mounting height is H, and an angle of the optical (light) axis of the camera 1 formed with the vertical line is θ. Also, the optical axial length of the line camera 1 which is a distance from the camera to a road surface 30 on the center line of the camera view is L.

A mounting error of the line camera 1 is considered to have two elements in the tilt direction (θ) and the pan direction (α) of the camera 1 as shown in FIG. 2.

① Effects Due to a Mounting Angular Error in the Tilt Direction

Now considering the case where H=2,600 mm and θ=13° as specific values in the mounted state of the line camera as shown in FIG. 1, it can be obtained that L=H/cos θ=2,668 mm.

In this case, the angular error in the tilt direction is caused By an error of the angle θ which changes the optical axial length L.

As the optical axial length L changes, the width of the horizontal view of the line camera 1 also changes at the same rate as the optical axial length L in accordance with the similarity principle since the horizontal view angle α of the line camera 1 is constant.

Namely, as shown in FIG. 3, the value of the horizontal distance from the optical axis center of the line camera 1 multiplied by the changing rate of the optical axial length L is a horizontal distance after the change. Assuming the mechanical positioning precision of e.g. a mounting bracket of the line camera 1 is θ±3°, a car side setting value for an off-lane alarm determination (judgement) set at a position of about 1400 mm on the left and the right sides from the optical axial center will change to 1400×(L−ΔL)/L.

The change of the car side setting value according to the change of the angle θ is shown in FIG. 4.

② Effects Due to a Mounting Error in the Pan Direction

The angular error in the pan direction means an error in the horizontal view direction of the optical axis of the line camera 1, and the optical axial length L also changes in a strict sense.

If the mechanical positioning precision in the pan direction of a mounting bracket or the like of the line camera 1 is supposed to be ±3°, the change ΔL of the optical axial length L can be approximated to zero. The camera view can be briefly considered as moving in parallel to the horizontal direction.

Namely, as apparent from FIG. 5, the error in the pan direction of the line camera 1 is caused by the parallel movement towards the horizontal direction, and therefore appears as a car side setting value itself for the off-lane determination.

Accordingly, the optical axial error in the pan direction can be determined by Ltan (ε) (ε=error angle) which can be approximated as an error of the car side setting value.

The change of the car side setting value according to the pan directional error is shown in FIG. 6.

③ Conclusion Derived from the Above Investigations

If it is assumed that the mounting precision of the line camera 1 has the precision of ±3° in the tilt direction, the effect due to the precision will appear as a change of the car side setting value for the off-lane determination of ± about 20 mm in the tilt direction. Therefore, the effect on the off-lane alarm function can be neglected.

However, in the case of the mounting precision in the pan direction being ±3°, it will appear as a change of the car side setting value for the off-lane determination of ± about 140 mm. Therefore, there is a large effect on the car side setting value for the off-lane determination. Also, there occurs a variety of timings for generating an alarm for various cars. Some corrections are required after the line camera 1 is mounted.

Solution

As described above, the error in mounting the line camera 1 should only consider the effect on the pan direction because of its largeness. For correcting and absorbing such an error, markers M1 and M2 are provided at a predetermined outside point (offset range) corresponding to a permissible error in the pan direction on the left and the right side ends of the car as shown in FIG. 7.

Then, the line camera 1 shoots the markers M1 and M2 in the form of image on the left and the right sides of the car 20. The horizontal position data of the binary images of the markers M1 and M2 as shot are previously stored in a memory by an image processing device at left and right side position data of the car 20.

Therefore, as shown in FIG. 7, the left and the right sides of the car 20 can be substantially defined by the markers M1 and M2, which is equivalent to the expansion of the car width.

A similar determination as the prior art on the basis of a relationship between the car side position data and the horizontal position data of the lane as actually sensed well be allowed by the image processing device to generate an accurate alarm in the absorbed form of the mounting error of the line camera 1.

It is to be noted that the above memory may comprise an EEPROM capable of electrical erasing and writing so that upon the power off the stored data may not be volatilized.

Also, a pre-adjusting operation that the horizontal position data of the binary image of the marker as shot are preliminarily stored in the memory may be performed on the basis of an ON/OFF state of a setting switch. In this case, the setting switch may comprise two respectively provided for the right and the left markers, with each independently performing the adjusting operation for the markers. For example, one may be adjusted at the time of shipment while the other may be made deeming the lanes as the markers during a normal running.

BRIEF DESCRIPTION OF THE DRAWINGS

FIG. 4 is a characteristic graph showing changes of car side setting values (deviation of alarm generating position due to errors in the tilt direction) with respect to a change of the angle (θ) in the tilt direction;

FIG. 8 is a block diagram showing one embodiment of an off-lane alarm apparatus according to the present invention;

Throughout the figures, the same reference numerals indicate identical or corresponding portions.

DESCRIPTION OF THE PREFERRED EMBODIMENT

Figure 1:
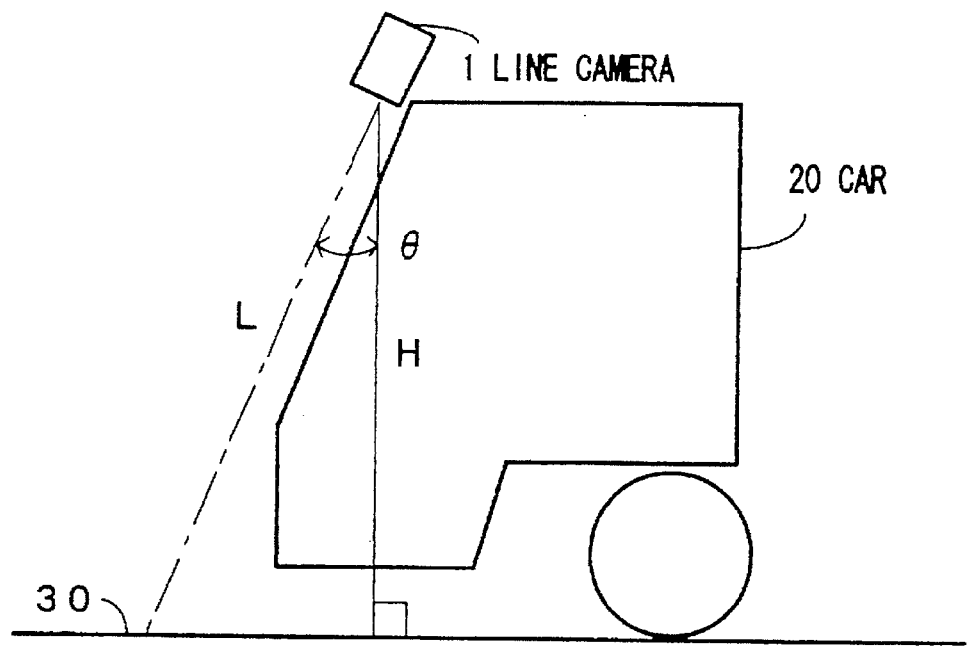
FIG. 1 is a schematic side view showing a state where a line camera is mounted on the front end of a car.
Figure 2:
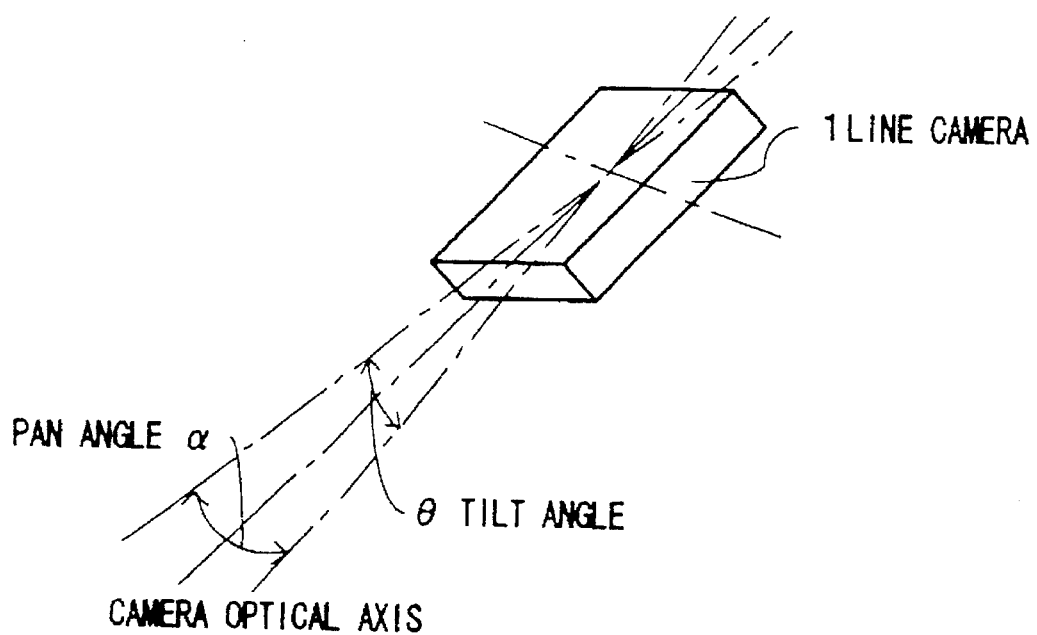
FIG. 2 is an oblique diagram showing angles in the tilt and pan directions of the line camera.
Figure 3:
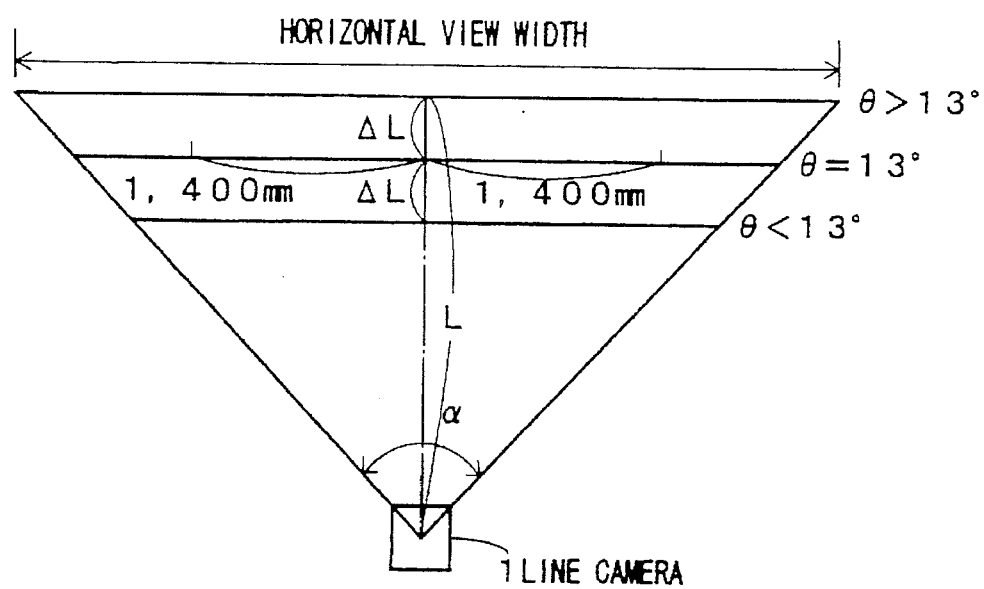
FIG. 3 is a plan view showing a change of horizontal view width of the line camera due to a change of the angle (θ) in the tilt direction.
Figure 5:
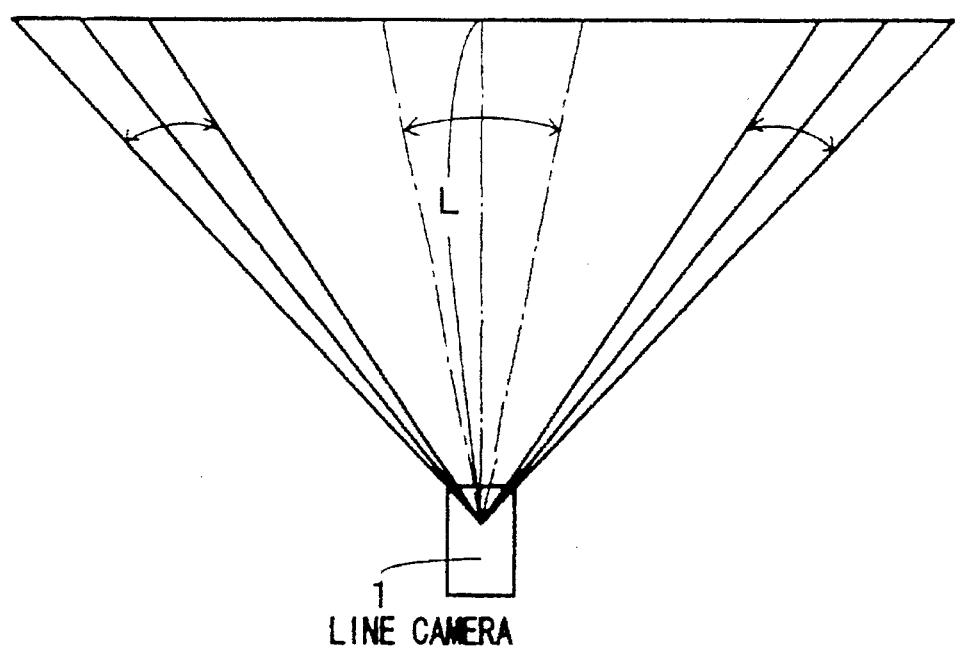
FIG. 5 is a plan view schematically showing a change of the view of the line camera due to a change of the mounted position in the pan direction.
Figure 6:
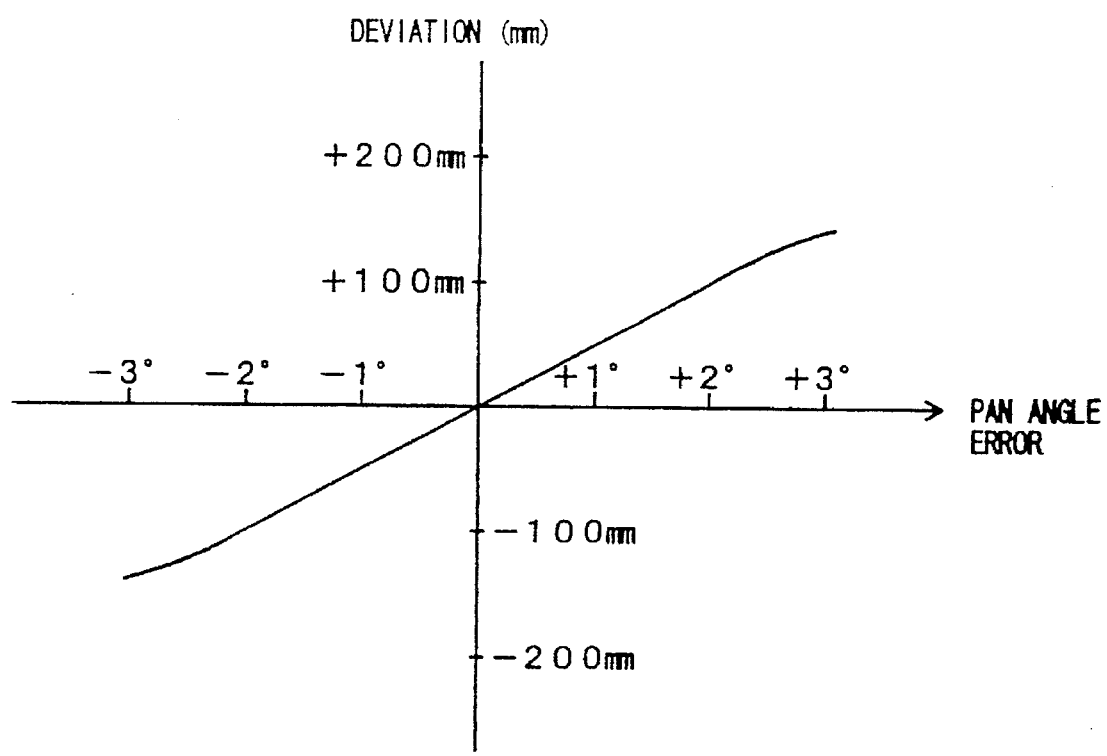
FIG. 6 is a characteristic graph showing changes of car side setting values (deviation of alarm generating positions due to errors in the pan direction)

FIG. 8 shows one embodiment of an off-lane alarm apparatus according to the present invention in the form of a block diagram. This off-lane alarm apparatus comprises a line camera 1 for detecting a lane, a setting switch 2, an image processing device 3 including the line camera 1 and a CPU for processing the output signals of the setting switch 2, an alarm device 4 such as a buzzer for giving a driver an alarm at the time of off-lane state, a write control circuit 5 activated in response to the signal from the setting switch 2, a memory 6 composed of an EEPROM and the like for providing as an output data stored therein when the setting switch 2 is OFF and for storing data from the image processing device 3 when the setting switch 2 is ON, and an alarm lamp 7 turned on when no data is stored in the memory 6.

It is to be noted that the setting switch 2 makes the memory 6 store the data which is obtained by sensing markers as will be described later by the line camera 1, and the write control circuit 5 applies a predetermined voltage to the memory 6 composed of the EEPROM to be stored with data.

The operation of this off-lane alarm apparatus will be hereinafter described along a flowchart shown in FIG. 9.

Figure 7:
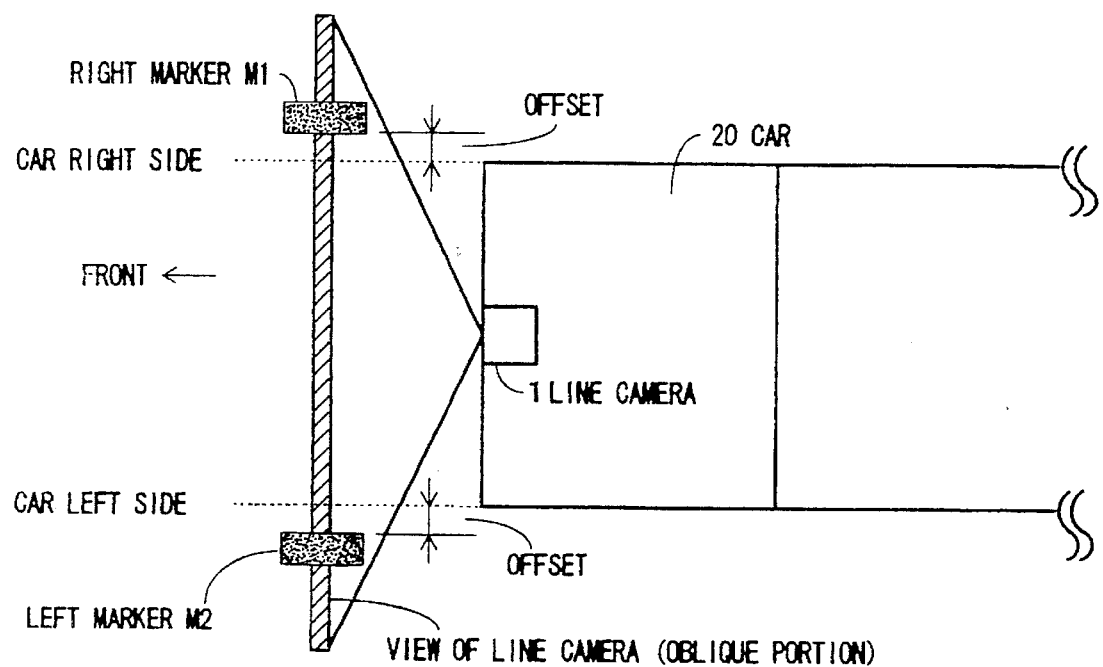
FIG. 7 is a plan view showing one example of setting markers for an off-lane alarm apparatus according to the present invention.

(1) Case of the Memory Being Write with Setting Values for an Off-line Alarm Determination for Pre-adjustments at the Shipment of the Apparatus (Setting Switch 2=ON):

As described with reference to FIG. 7, the markers M1 and M2 respectively corresponding to a lane (white lane) are provided at predetermined positions within the view of the line camera 1 at the front end of the car 20. The markers M1 and M2 are positioned at predetermined outside points (offset range) of the car corresponding to a permissible error (±3°) in the pan direction of the line camera 1. This is substantially equivalent to the expansion of the width of the car 20.

It is to be noted that at the time of pre-adjustments for the shipments on car manufacturing lines, the positions of the markers M1 and M2 should be decided with jigs satifying a predetermined offset range The length of the markers M1 and M2 should be ensured by a necessary minimum in consideration of the precision of the mounting angle in the tilt direction so that the markers may surely lie within the view of the line camera.

Then, both sides of the car 20 are to be positioned as shown in the figure. The setting switch 2 is set ON for the writing of the memory.

Figure 9:
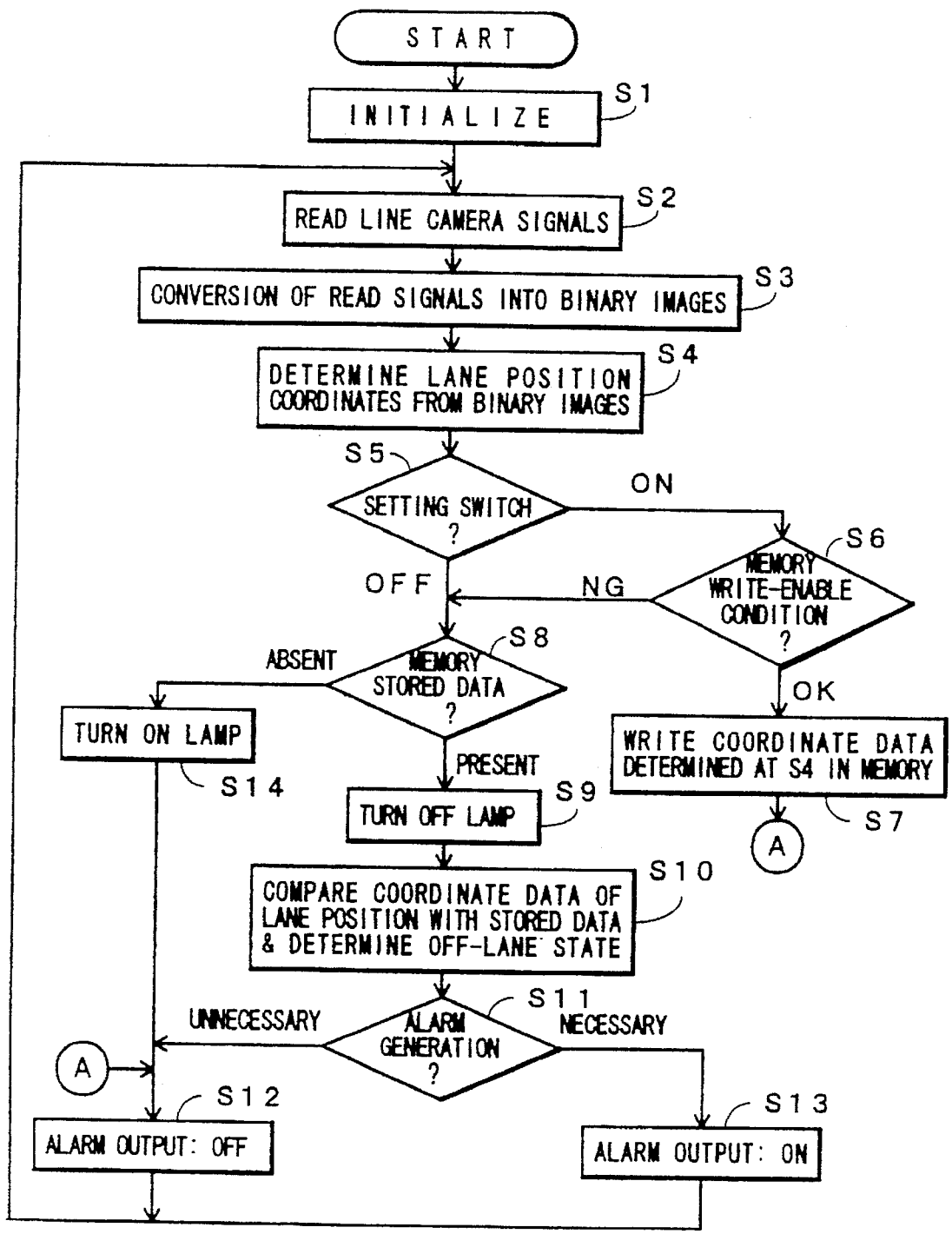
FIG. 9 is a flow chart of a control program stored in and executed by an image processing device (CPU) shown in FIG. 8.
Figure 10A:
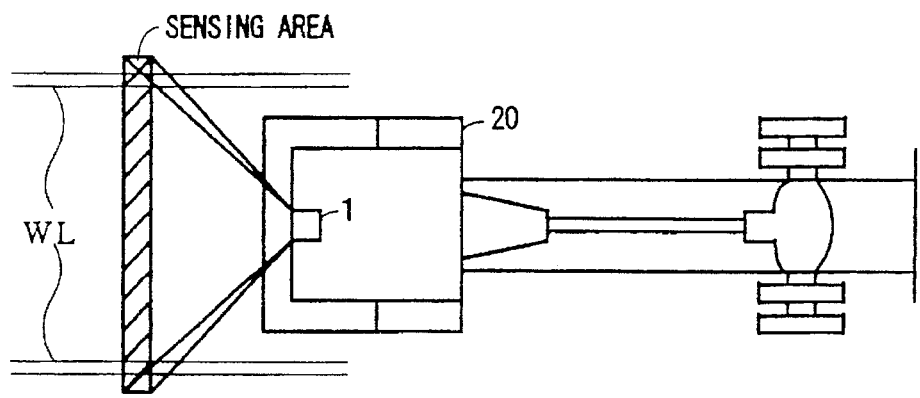
FIGS. 10A and 10B are schematic diagrams respectively showing a positional relationship between a car and a line camera.
Figure 10B:
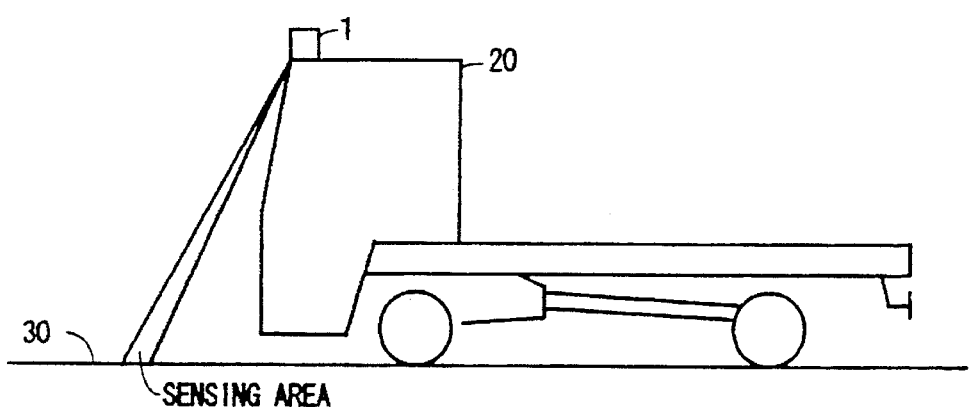

Under these conditions, the flow chart in FIG. 9 is executed, and the image processing device (CPU) 3 conducts an initialization at step S1 for the activation of the apparatus.

Then at step S2, the left and the right markers M1 and M2 are shot by the line camera 1, the output of which is read into the image processing device 3.

At step S3, the output signal (brightness signal) of the line camera 1 read at step S2 is quantized or digitized into a binary image signal whereby only the images of the markers M1 and M2 can be extracted.

At step S4, horizontal position data of the binary image of the markers M1 and M2 are determined with reference to the coordinate of the camera 1 from the result of step S3.

After the state of setting switch 2 being checked at step S5, the program will proceed to step S6 since the setting switch 2 is preliminarily set ON as described above.

At step S6, it is checked whether or not the coordinate data obtained at step S4 may be written in the memory 6. Specifically, it is checked whether the data of the markers M1 and M2 obtained at step S4 indicate abnormal positions on the coordinate or the lane width coresponding to the markers. This is because erroneous data caused by noise due to e.g. dirt of a brightness confused with the markers in the image provided by the line camera must not be written in the memory 6.

As a result of the check at step 56, if it has been found that the data are suitable, the coordinate data at step S4 are written in the memory 6 at step S7. If the data have been already written, the old data is once erased and then written for the renewal.

Then, the program proceeds to step S12 at which the alarm device 4 is not energized and the alarm output is left OFF, and then returns to step S2.

Through a series of the above described steps, the image shot at the marker position can be stored in the memory 6 as data determining whether or not an off-lane alarm should be generated. Although it has been described above that the setting switch 2 is used as a single and the markers are simultaneously positioned to write the left and the right side data of a car in the memory at the same time, it is also possible to use the arrangement in which the left and the right side data are independently written in the memory, for example by providing the setting switch separately for the left and the right markers. This arrangement enables arbitrary setting to be made in accordance with preferences of a driver by using actual white lanes etc painted on a road while a car is running on the road exept the case of pre-adjustments for shipment. A driver only has to drive a car within a lane so that white lanes are positioned at a desired place and switch ON the corresponding switch 2.

(2) Case of the Apparatus Being Operated as a Normal Off-lane Alarm Apparatus (Setting Switch 2=OFF):

Firstly, the processing from steps S1 to S4 is carried out in the same manner as Case (1).

At step S5, the state of the setting switch 2 is checked. Since the setting switch 2 is left OFF if it should be operated for a normal off-lane alarm apparatus, the program proceeds to step S8.

At step S8, the presence or absence of data stored in the memory is checked. If no data is stored in the memory 6 as described above, it is not possible to make an off-lane alarm determination, so that at step S14 the alarm lamp 7 is turned on to inform a driver of the state where the apparatus is not operable. At step S12, the alarm output is left OFF and the program returns to step S2. If it has been found at step S8 that there is stored data in the memory, or the memory 6 has been already written with data, the alarm lamp 7 will be turned off at step S9.

At step S10, the coordinate data of the lane positions determined at step S4 and the coordinate data of the markers M1 and M2 previously stored in the memory are compared. If it has been found as a result of the comparison at step S10 that the car does not lie within the lanes, it is then determined at step S11 that an alarm is necessary to be generated so that the alarm device 4 is energized to generate an alarm output at step S13.

On the contrary, if it has been found as a result of the comparison at step S10 that the car lies within the lanes, it is then determined at step S11 that no alarm is necessary, so that an alarm output is made OFF at step S12.

After the execution of steps S13 and S12, the program returns to step S2 and repeats a series of the above steps.

In the above, if the memory 6 employs an EEPROM, the data stored therein are not extinguished even though the power source of the apparatus is switched OFF. Therefore, if the image data of the markers are written in the memory at the stage of shipment on car manufacuturing lines, there is no need to switch ON/OFF the power source and make write operations for the memory even though the battery is detached from the car for inspections etc, one by one.

As mentioned above, since an off-lane alarm apparatus according to the present invention is arranged such that after mounting a line camera on a car, markers preset at predetermined positions outside of the car are shot and preliminarily stored as an image and the positional information is used as car side positional information for alarm determinations, it becomes possible to make a simple pre-adjustment in a short time without complicated and fine pre-adjustments for the mounting angle of the line camera.

The present invention also makes it possible to unify the performance of products to be shipped at the time of pre-adjustments of a car having mounted thereon the off-lane alarm apparatus. After shipments to the market, setting values can be easily modified by dealers etc in accordance with preferences of a user, and alarm setting values can also be modified during the actual running of a car.

What we claim is:

1. An off-lane alarm apparatus wherein an image signal provided from a line camera mounted on a car is quantized into a corresponding binary image by an image processing device to detect a lane on a road surface whereby an alarm is generated when an off-lane state of said car from said lane is detected, said apparatus comprising a memory; said image processing device having preliminarily stored, in said memory, horizontal position data as car side position data of binary images of markers positioned at a predetermined outside point corresponding to a permissible error in the pan direction of said line camera on both side ends of said car and shot as said image signal by said line camera positioned at a predetermined front center of said car; and said image processing device generating said alarm on the basis of a relationship between the horizontal position data of the detected lane and the position data of both side ends of said car.

2. An off-lane alarm apparatus as claimed in claim 1, wherein said memory comprises an EEPROM with electrically erasing and writing functions.

3. An off-lane alarm apparatus as claimed in claim 1, further comprising a setting switch, wherein said image processing device has preliminarily stored, in said memory, the horizontal position data of said markers, on the basis of an ON/OFF state of said setting switch.

4. An off-lane alarm apparatus as claimed in claim 3, wherein said setting switch comprises two switches respectively provided for the right and the left markers, with each of said two switches independently providing as an output its ON/OFF state for said image processing device.

5. An off-lane alarm apparatus wherein an image signal provided from a line camera mounted on a car is quantized into a corresponding binary image by an image processing device to detect a lane on a road surface whereby an alarm is generated when an off-lane state of said car from said lane is detected, said apparatus comprising a memory; said image processing device having preliminarily stored, in said memory, horizontal position data as car side position data of binary images of desired actual lanes as reference markers along which said car is running, shot as said image signal by said line camera positioned at a predetermined front center of said car; and said image processing device generating said alarm on the basis of a relationship between the horizontal position data of the detected lane and the position data of both side ends of said car.

6. An off-lane alarm apparatus as claimed in claim 5, wherein said memory comprises an EEPROM with electrically erasing and writing functions.

7. An off-lane alarm apparatus as claimed in claim 5, further comprising a setting switch, wherein said image processing device has preliminarily stored, in said memory, the horizontal position data of said markers, on the basis of an ON/OFF state of said setting switch.

8. An off-lane alarm apparatus as claimed in claim 7, wherein said setting switch comprises two switches respectively provided for the right and the left markers, with each of said two switches independently providing as an output its ON/OFF state for said image processing device.

9. An off-lane alarm apparatus for a vehicle, comprising:

a camera mounted on the vehicle to produce an image signal;

an image processing device, coupled to said camera, to process the image signal to detect a lane on a road surface;

a memory, coupled to said image processing device, to preliminarily store horizontal position data corresponding to markers positioned at predetermined points with respect to the sides of the vehicle and corresponding to a permissible error in a pan direction of said camera, said image processing device generating an alarm signal on the basis of detected horizontal position data which is based on the preliminarily stored horizontal position data and the image signal processed by said image processing device.

10. A method for detecting when a vehicle is off-lane, comprising:

producing an image signal by a camera mounted on the vehicle;

preliminarily storing horizontal position data corresponding to markers positioned at predetermined points with respect to the sides of a vehicle and corresponding to a permissible error in a pan direction of the camera; and generating an alarm signal based on the preliminarily stored horizontal position data and the image signal.

* * * * *

UNITED STATES PATENT AND TRADEMARK OFFICE
CERTIFICATE OF CORRECTION

PATENT NO. : 5,661,472
DATED : August 26, 1997
INVENTOR(S) : Koshizawa

It is certified that error appears in the above-identified patent and that said Letters Patent is hereby corrected as shown below:

On the title page:

Item: [57] Abstract
Line 2, delete "is".

Column 3
Line 2, change "By" to --by--.

Column 6
Line 1, change "56" to --S6.--.

Signed and Sealed this

Twenty-seventh Day of January, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,661,472
DATED : August 26, 1997
INVENTOR(S) : Koshizawa

It is certified that error appears in the above-identified patent and that said Letters Patent is hereby corrected as shown below:

Column 1
    Line 39, after "place" insert --,--.

Signed and Sealed this

Sixteenth Day of June, 1998

Attest:

BRUCE LEHMAN

Attesting Officer     Commissioner of Patents and Trademarks